Figure 11:
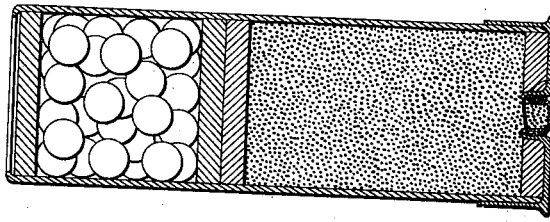

(No Model.) 2 Sheets—Sheet 1.
S. A. DAY.
ELECTRIC PRIMER.
No. 389,448. Patented Sept. 11, 1888.
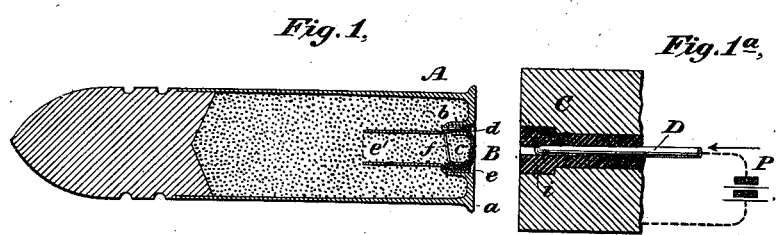
Fig. 1. Fig. 1a.
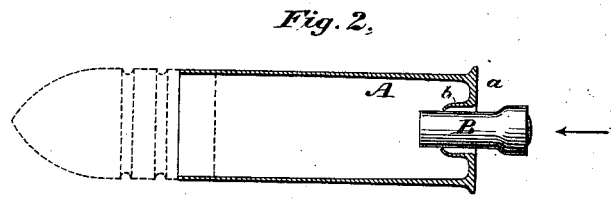
Fig. 2.
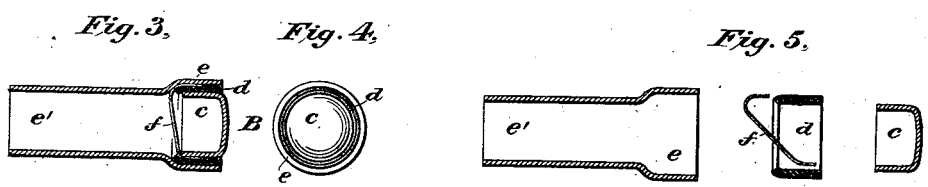
Fig. 3. Fig. 4. Fig. 5.
Fig. 6. Fig. 7. Fig. 8. Fig. 9.
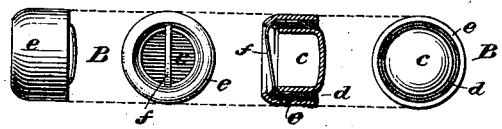
Fig. 10.
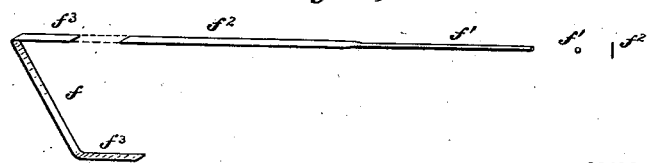
WITNESSES:
Geo. W. Breck.
Carrie E. Ashley
INVENTOR:
Selden A. Day,
By his Attorneys,
Arthur E. Fraser & Co.

(No Model.) 2 Sheets—Sheet 2.

S. A. DAY.
ELECTRIC PRIMER.

No. 389,448. Patented Sept. 11, 1888.

WITNESSES: Geo. W. Breck. Carrie E. Ashley.

INVENTOR: Selden A. Day.
By his Attorneys,
Arthur E. Fraser & Co.

UNITED STATES PATENT OFFICE.

SELDEN A. DAY, OF BOWLING GREEN, OHIO, ASSIGNOR TO THE AMERICAN ELECTRIC ARMS AND AMMUNITION COMPANY, OF NEW YORK, N. Y.

ELECTRIC PRIMER.

SPECIFICATION forming part of Letters Patent No. 389,448, dated September 11, 1888.

Application filed March 23, 1888. Serial No. 268,261. (No model.)

*To all whom it may concern:*

Be it known that I, SELDEN A. DAY, a citizen of the United States, residing in Bowling Green, Wood county, Ohio, have invented certain new and useful Improvements in Electric Cartridges and Primers, of which the following is a specification.

This invention relates to cartridges for electric guns and to electric primers or caps or exploders applicable to cartridge-shells, in order to convert them into electric cartridges.

The invention relates, partly, to that class of electric cartridges employing a high-resistance wire or conductor in contact with the powder or fulminate, and which ignites the same upon being heated to incandescence by the passage of an electric current.

It also pertains to the mechanical construction of electric cartridges in general, whether firing by means of an incandescent wire or by the passage of sparks between two adjacent conducting-points.

Prior to my invention several different constructions of electric cartridges have been devised both for firing by incandescence and by sparks. According to one construction the cartridge is provided with a central or axial conducting-pin extending from the center of the base toward the front of the charge of powder inclosed in a tubular insulating-sheath to insulate it from the base, said sheath fitting tightly in the neck or seating at the base, with a conducting-strip of metal extending from the base along the outside of the sheath to the front thereof, and a fine platinum wire soldered at one end to said strip and at its other end to the front of the central pin. This construction is the subject of Patent No. 307,071, dated October 21, 1884. According to another construction a metal tube fitting tightly over the exterior of the insulating-sheath is substituted for the strip of metal in the patent just referred to, so that the insulating-sheath has an inner electrode or leading-in conductor within it, consisting of a metal pin, and an outer electrode or leading-in conductor exterior to it, consisting of said metal tube, with the fine platinum wire soldered at one end to the inner conductor and at the other end to the outer conductor. This construction is described in Patent No. 319,627, granted June 9, 1885, to the American Electric Arms and Ammunition Company. According to still another construction the tubular insulating-sheath has a metal pin within it and a metal tube exterior to it, this tube extending beyond the forward end of the sheath in order to form a recess at the front end of the electric primer or exploder for inclosing and protecting the fine platinum wire and for holding a portion of powder. This construction is disclosed in Patent No. 319,629, dated June 9, 1885, to the American Electric Arms and Ammunition Company. The cartridges shown in the two last-mentioned patents are the most perfect in construction of any electric cartridges heretofore devised, so far as I am aware. They are subject, however, in common with all central-fire electric cartridges, the conductors or electrodes of which terminate at the base of the cartridge for connection with the electrodes in the electric gun, to the serious practical disadvantage that the connection of the electric primer with the shell is not gas-tight, so that the cartridges rapidly deteriorate by firing, and can consequently be used only once, or only a very small number of times, and the perfection of the electrical contacts or connections is liable to be seriously impaired through oxidation by a local galvanic action consequent upon the admission of moisture. The manufacture of such electric cartridges or primers has also been attended with considerable difficulty and expense, owing to the necessity for joining the ends of the minute platinum wire to the front ends of the respective inner and outer conductors or electrodes by the process of soldering. This difficulty is increased by the construction of a recess at the front of the primer to receive the platinum wire, and as such a recess is of great practical advantage it becomes highly desirable to provide some means of joining the ends of the platinum wire which shall avoid the necessity for soldering.

The objects of my invention are to provide a construction for electric cartridges or primers which shall render them gas-tight and shall provide a cheap and effective substitute for the soldering of the ends of the platinum or other highly-resistant wire or conductor, in order to cheapen the manufacture of the cartridges or primers and render it possible to turn them out rapidly and in large quantities by means of special machinery.

According to my invention I construct the electric primer or exploder with a tubular insulating-sheath, with an inner conductor within said sheath and a tubular outer conductor surrounding said sheath, and, in the case of cartridges for firing by incandescence, with a platinum wire or other equivalent high-resistance conductor at the front of the sheath, making contact at one end with the inner and at the other with the outer conductor, all in general similar in respect of its electrical features to the constructions heretofore known. Instead, however, of employing a solid metal pin as the inner conductor, I employ a metallic cup of thin metal fitted tightly within the sheath, with its open side toward the front, so that a powder-chamber is formed within the central conductor, instead of being entirely in front of it, as heretofore. When the primer thus constructed is seated in the primer seat at the base of the shell, the cup acts, upon being expanded by a pressure within it, to force the intervening insulating-sheath outwardly into such close contact with the seat as to form a perfect gas-check for the cartridge. As the cartridge shell and primer are successively used, the successive explosions expand the walls of the central metallic cup (which is preferably made of copper) sufficiently each time to compensate for any looseness of fit in the primer-seat occasioned by the expansion of the seat or the compression of the insulating-sheath, so that the joint around the primer is kept gas-tight and so close as to prevent the entrance of moisture and the consequent deterioration of the primer.

In order to provide a suitable electrical connection between the opposite ends of the platinum wire and the respective inner and outer conductors, I construct the primer with one end of the platinum wire confined between the insulating-sheath and the inner conductor and with its other end confined between the sheath and the outer conductor, a sufficient length of the wire being extended into contact with the respective conductors to insure a suitable electrical contact between them. Since the respective conductors are fitted very tightly within and without the insulating-sheath, the ends of the platinum wire are very tightly confined, whereby its attachment is rendered secure and permanent. The insulating-sheath is made longer than the inner conductor, so that it projects farther to the front and prevents contact between the inner conductor and the portion of the platinum wire adjacent to its connection with the outer conductor, whereby the short-circuiting of the incandescing conductor is avoided.

In order further to improve the electrical contact with the ends of the platinum wire and render the primer more effectually moisture-proof and more durable, I flatten the platinum wire to an extremely thin ribbon, so that an extended area of contact-surface is insured between the respective end portions of the platinum conductor and the respective outer and inner conductors or electrodes.

In the accompanying drawings, which illustrate my invention in its preferred and in certain modified forms, the cartridges and primers represented are drawn to magnified scales.

Figure 12:
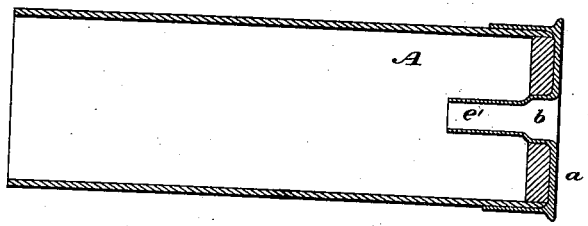
Figures 13, 14:
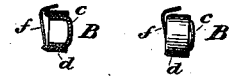
Figures 15, 16:
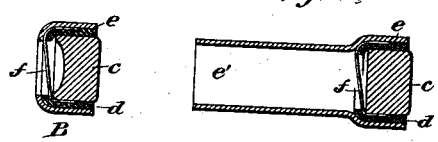
Figure 17:
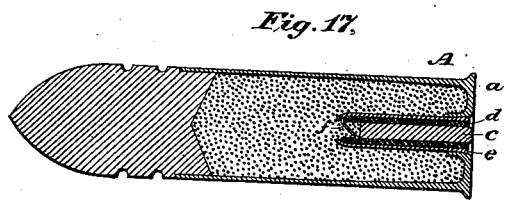
Figure 18:
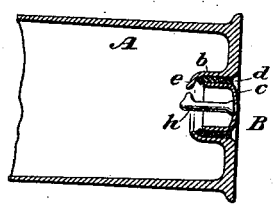

Figure 1 is a longitudinal mid-section of an electric cartridge and its primer embodying the preferred construction of my invention. Fig. 1ª is a corresponding section of the forward part of the breech-block of an electric gun, showing the respective electric terminals or electrodes and indicating in diagram the electrical circuit. Fig. 2 is a longitudinal section of the empty shell of the cartridge shown in Fig. 1, with the electric primer shown in elevation partly inserted therein. Fig. 3 is a longitudinal mid-section, on a larger scale, of the construction of primer shown in Fig. 1. Fig. 4 is a rear elevation of the primer shown in Fig. 3. Fig. 5 is a longitudinal mid-section of the several parts constituting this primer separated from one another. Figs. 6, 7, 8, and 9 show a slightly-modified construction of primer, Fig. 6 being a side elevation, Fig. 7 a front elevation, Fig. 8 a diametrical longitudinal section, and Fig. 9 a rear elevation. Fig. 10 is a perspective view illustrating the flattening of the high-resistance platinum wire and the formation of the incandescing conductor, the view being on a much enlarged scale. Fig. 11 is a longitudinal mid-section of a shotgun or sporting cartridge, the electric primer of which is constructed according to a modified adaptation of my invention. Fig. 12 is a longitudinal section of a cartridge-shell, and Fig. 13 is a like section of the electric primer therefor. Fig. 14 is a side elevation of this primer. Figs. 15 and 16 are diametrical longitudinal sections of two different constructions of primers, illustrating a modification of my invention. Fig. 17 is a longitudinal mid-section of a cartridge and primer embodying a further modification. Fig. 18 is a similar section of an electric cartridge for firing by means of electric sparks, constructed according to one part of my invention.

Referring to the drawings, let A designate the cartridge-shell, and B the electric primer or "cap" or "exploder" or "ignitor" therefor, as it may be variously termed. The shell A is of the usual or any suitable construction. That shown in Figs. 1, 2, and 17 is a metallic shell, and that shown in Figs. 11 and 12 is a paper shell. In either case the shell has a metallic base, $a$, the central portion of which is turned inwardly to form the usual neck or primer-seat, $b$.

The electric primer B consists of an inner metallic conductor or leading-in electrode, $c$, a tubular sheath, $d$, of insulating material, and an outer metallic conductor or leading-in electrode, $e$, with a high-resistance or incandescing conductor, $f$, preferably of very fine platinum or iridio-platinum wire. In the case of a cartridge to be fired by electric sparks this high-resistance wire will be omitted, and in its place conducting points or terminals will be arranged adjacent to each other for the passage of the sparks between them.

Referring especially to Figs. 1 to 10, the primer B is constructed, according to my invention, with the outer conductor, $e$, in the form of a thin metal tube, into which the insulating-sheath $d$ fits very tightly, so as to require considerable force to drive it in, and with the inner conductor, $c$, made in the form of a thin metal cup, which fits very tightly within the insulating-sheath, being arranged with its open side toward the front. The insulating-sheath is made longer than this cup, so that when they are united the sheath shall project beyond the front of the cup. The outer tube, $e$, will also, by preference, be made longer than the sheath, so that it shall project forward beyond both the sheath and cup.

The incandescing conductor $f$ is made of a very fine platinum wire, (shown magnified at $f'$ in Fig. 10,) which is first flattened, by passing it between pressure-rolls, into an extremely thin ribbon, as shown at $f^2$ in Fig. 10, and is subsequently bent into U shape and cut off, as shown at $f$ in Fig. 10. One of the turned-back arms $f^3$, Fig. 10, of this conductor is inserted flatwise between the cup $c$ and sheath $b$, whereby this end of the conductor is connected electrically with the cup or inner conductor, $c$, and the other turned-back arm $f^3$ is inserted between the sheath $d$ and the outer tube, $e$, whereby the other end of the incandescing conductor is electrically connected with the outer conductor or tube, $e$. The insertion of these arms is effected during the forcing together of the parts $c$, $d$, and $e$. This operation is preferably performed by first inserting one end of the flattened wire or ribbon $f^2$, Fig. 10, within the sheath $d$, and then forcing the cup $c$ into the sheath, so as to confine this end between the two. Then the ribbon is drawn diametrically across the sheath and turned back against the exterior thereof. It is then cut off, and, finally, the sheath is forced into the tube $e$, so that the outer end of the platinum ribbon is caught and confined between the two. The platinum ribbon or wire is thus brought into the position shown in Figs. 3 and 8, and extending diametrically across the front of the primer and across the recess or powder-space formed by the open interior of the cup $c$ and the forward extension thereof formed by the projection beyond the cup of the insulating-sheath. The platinum wire may be strained across this space or not, according to the method employed in its manufacture.

The flattening of the platinum wire not only enables it to be more easily and conveniently manipulated during the putting together of the parts, but also has the great advantages of affording an extended contact-surface against the respective conductors $c$ and $e$, so that it makes a good electrical contact therewith without undue resistance, so that the passage of the current between the platinum wire and these conductors cannot oxidize either of them at their union, and thereby impair their connection, and also of taking very much less space between the insulating sheath and the respective outer and inner conductors than would be occupied by a round wire, so that the sheath and conductors are not forced apart so far as to in the least impair their fit or form interstices for the admission of moisture or gases, whereby the tightness of the primer is insured and it is enabled to resist the influence of moisture. Electric cartridges thus constructed have been buried in the earth for several months in a moist place without being in the least deteriorated thereby. The flattening of the platinum wire also seems to have the effect of enabling it to withstand the heat caused by the passage of the electric current through it for a longer time than the round wire, so that it makes a primer which can be fired a greater number of times before burning itself out—a result that I attribute to the greater radiating-surface of the flattened wire, since the resistance of the wire is the same after being flattened as before.

The outer tube, $e$, of the primer is made a tight and exact fit with the neck or primer-seat $b$ of the cartridge-shell, so that considerable pressure is required to force it into place therein. In the filling of the shell the powder enters within the recess in the cup $c$ and surrounds the platinum wire on all sides. When the electrical current is passed through the platinum wire and heats the latter the powder in contact with it is ignited and burns outwardly from the front of the primer, and also inwardly within the cup $c$, so that instantly a gaseous pressure is generated within this cup, which serves to expand its walls closely against the insulating-sheath and to expand the latter and the tube $e$ against the primer-seat, whereby the joints between the respective parts are kept gas-tight, so that the escape of gas from the cartridge is prevented and the leakage of gaseous corrosive agents into contact with the electrical connections, whereby the latter might be corroded and a perfect contact impaired, is avoided.

The tube $e$ may terminate close to the front of the insulating sheath, as shown in Figs. 6, 7, and 8, in which case the charge of powder in the cartridge will be ignited at the rear and will burn thence forward. It is preferable, however, to form the tube $e$ with a forward extension, $e'$, as shown in Figs. 1 to 5, in order to form a deep powder-chamber, as indicated in Fig. 1, so that the powder in this chamber will burn forward through the tube $e$ and ignite the main portion of the charge of powder at the front of this tube, from which point it will burn backward to the rear of the charge as well as forward.

The tube $e'$ may be made of any length desired, in order to ignite the main charge nearer to or farther from the front thereof. My improved means for joining the ends of the platinum wire is especially advantageous in this construction, since it would be practically impossible to join the ends by soldering when the wire was arranged so far within the tube or in so deep a recess or chamber.

Heretofore it has been necessary, in order to carry the fire forward into the charge, to arrange the platinum wire at the front of the primer—a construction which is inferior to that provided by my invention, as illustrated in Figs. 1 to 5, in that there is no opportunity for the construction of a gas-check, since the portion of the primer to the rear of the wire has had heretofore to be made solid, and in that the wire is more exposed to injury, and the primer consequently cannot be used as many times as when it is arranged near the bottom of a deep recess or cavity. In either construction it is preferable to form the tube $e$ with a slight contraction at its forward end, in order to embrace and partly inclose the front end of the sheath and limit the forward movement of the sheath in putting the parts together. The front of the sheath may also advantageously be turned in to slightly lap over and protect the forward end or edge of the cup $c$.

An electric gun for firing the cartridge thus constructed must have at its breech-block two electrodes or terminals in connection with the opposite poles of a galvanic battery or other generator of an electric current and means for closing the circuit between said battery and the electrodes $c\ e$ of the cartridge-primer after the cartridge has been placed in the gun.

Fig. 1$^{a}$ shows the construction of the breech-block and one means for closing the electric circuit to fire the cartridge. The breech-block C itself constitutes one electrode, and the other electrode consists of a metal pin, D, arranged in line with the axis of the cartridge, so that when the latter is in place with its base $a$ against the block C the circuit will be closed by pushing forward the pin D (by pulling the trigger of the gun) until its front end touches the cup $c$, whereupon the current will flow through the pin D, cup $c$, platinum wire $f$, tube $e$, and base $a$ into the breech-block C, and thence back to the battery. The firing-pin D is insulated from the breech-block by a plug, $i$, of insulating material—such as bone or other hard substance—which must be of sufficiently large diameter to cover the rear of the cup $c$ and prevent any portion of the latter coming in contact with the breech-block C, as thereby the primer would be short-circuited.

It will be observed that after the primer B has been inserted in the cartridge shell its outer tube, $e$, stands in close and intimate contact with the neck or primer-seat $b$, so that both electrically and mechanically these two tubular parts constitute substantially but one part. The only reason for employing both tubes $e$ and $b$ is to construct the primer B complete in itself, so that it can be made a distinct article of sale in the same manner that percussion-caps are, without liability of injuring it or rendering it inoperative, either in packing, transit, or storage, or in the operation of inserting it into the cartridge-shell. Otherwise the tube $e$ might be omitted and the primers sold to consumers with only the parts $c$, $b$, and $f$; but if so sold the outer end of the platinum wire would project out loosely and unattached, and be liable, owing to its extreme fragility, to become pulled out or injured; but in those cases where the cartridges are manufactured complete at a factory it is preferable to omit the tube $e$ and construct the neck $b$ of the cartridge shell to take its place. Such a construction is shown in Figs. 11 to 14. In Fig. 11 the neck $b$ is short, answering to the tube $e$ in Figs. 6 to 8, while in Fig. 12 the neck is prolonged forward into the charge of powder, forming the tubular extension $e'$ found in the constructions shown in Figs. 1 to 5. In Fig. 12 the shell is shown empty, the primer not having yet been inserted. The primer is shown in Figs. 13 and 14. It will be seen from these figures that the outer tube, $e$, is omitted from it, so that the outer end of the platinum wire is free or unattached. To complete the primer, it is forced into the neck $b$, which constitutes the outer tube or conductor, $e$, of the primer, the primer being shown thus inserted in Fig. 11. The primers might be sold to consumers in the condition shown in Figs. 13 and 14 were it not for the inconvenience and liability to injury that might result from the outer end of the platinum wire being left free. This difficulty, however, might be overcome by cementing the platinum wire to the exterior of the insulating-sheath. The friction against the platinum wire in the act of inserting the primer will suffice to brighten its surface and make a good electrical connection.

The feature of my invention which pertains to the fastening of the ends of the platinum wire may be used without the feature of the inner conductor being made in the form of a cup to form a gas-check.

Figs. 15 and 16 show a primer wherein the inner conductor, $c$, is a solid block or button of metal instead of being made a sheet-metal cup. This block may be hollowed out at its front end, as shown in Fig. 15, to deepen the powder-recess behind the platinum wire and prevent liability of short-circuiting that wire by its being pressed back into contact with the front of the block $c$; or the block may be made without such recess, as shown in Fig. 16. In the latter case the recess through which the platinum wire crosses is formed solely by the projection of the insulating sheath beyond the front of the inner conductor, $c$, whereas in the former case and in the construction shown in the previous figures there is in addition to such recess a further cavity in the conductor $c$ itself, and the platinum wire crosses entirely in front of this latter cavity.

Fig. 17 shows a construction wherein the inner conductor, $c$, is prolonged forward and made solid, being substantially a pin, and the insulating-sheath is prolonged considerably beyond this pin to form a suitable deep recess for the platinum wire.

The feature of my invention which provides a gas-check for electric cartridges or primers is applicable to those cartridges which fire by an electric spark, as well as those employing an incandescing wire. Fig. 18 shows this feature of my invention as applied to a spark fire cartridge. The cup $c$ and sheath $d$ are constructed the same as already described with reference to Figs. 3 and 5, for example, and the sheath fits tightly into the neck $b$ of the shell. A post, $h$, is fastened axially within the cup $c$ by riveting its rear end to the center of the cup, as shown, or otherwise, and this post has an arm or finger projecting to one side and approaching close to the edge of the neck $b$, so that electric sparks may pass between this point and the edge of the neck, thereby igniting the intervening gunpowder. The powder will enter the recess or cavity in the cup $c$, and in exploding will expand the cup and form a gas-check.

My invention will be in part availed of if in a cartridge or primer having an incandescing-conductor, $f$, only one end of such conductor is confined between the insulating-sheath and one or other of the leading-in conductors or electrodes $c$ and $e$, (or $b$,) the other end of the incandescing conductor being fastened by soldering or otherwise.

I claim as my invention the following-defined novel features, substantially as hereinbefore specified, namely:

1. In an electric primer or cartridge, the combination of a metal cup arranged with its open side toward the front and adapted to constitute one of the electrodes of the cartridge with a tubular insulating-sheath around said cup, adapted in use to electrically separate said cup from the other electrode of the cartridge, whereby in the firing of the cartridge the sides of said cup are adapted to expand and force the insulating-sheath against the primer-seat to form a gas-check.

2. The combination, with a cartridge-shell having a turned-in neck to form a primer-seat, of a metal cup placed in said seat with its open side toward the front and an insulating sheath intervening between said cup and neck.

3. The combination, to form an electric primer, of a tubular insulating-sheath, a conductor within it, consisting of a metal cup arranged with its open side toward the front, and an outer conductor, consisting of a metal tube surrounding said sheath and electrically separated thereby from said cup.

4. In an electric primer or cartridge, the combination of a tubular insulating-sheath, an inner metallic conductor within said sheath, an outer metallic conductor exterior to said sheath, and an incandescing-conductor having one end confined between the sheath and one of said conductors and its other end electrically connected to the other of said conductors.

5. In an electric primer or cartridge, the combination of a tubular insulating-sheath, an inner metallic conductor within said sheath, an outer metallic conductor exterior to said sheath, and an incandescing conductor having its one end confined between the sheath and the inner conductor and its other end confined between the sheath and the outer conductor, whereby its ends are brought into electrical connection with said conductors.

6. The combination, to form an electric primer, of a tubular insulating-sheath, a tubular outer metallic conductor surrounding said sheath, an inner metallic conductor inclosed by said sheath and of less length than the sheath, so that the latter projects forward beyond it and forms a recess, and an incandescing-conductor having its one end confined between the sheath and the inner conductor and its other end confined between the sheath and the outer conductor and arranged to cross said recess.

7. The combination, to form an electric primer, of a tubular insulating-sheath, a tubular outer metallic conductor surrounding said sheath, an inner metallic conductor inclosed by said sheath and recessed on its forward side to form a powder-cavity, and an incandescing conductor having its one end confined between the sheath and the inner conductor and its other end confined between the sheath and the outer conductor and arranged to cross in front of said powder-cavity.

8. In an electric cartridge or primer, the combination of a tubular insulating-sheath, an inner metallic conductor within said sheath, an outer metallic conductor exterior to said sheath, and an incandescing-conductor consisting of a fine wire having a flattened end confined flatwise between the sheath and one of said conductors and its other end electrically connected to the other of said conductors.

9. The combination, to form an electric primer, of a tubular insulating-sheath, an inner metallic conductor within said sheath, an outer metallic conductor exterior to said sheath, and an incandescing conductor having the form of a flat ribbon and arranged with its one end confined flatwise between the sheath and the inner conductor and its other end confined flatwise between the sheath and the outer conductor.

In witness whereof I have hereunto signed my name in the presence of two subscribing witnesses.

SELDEN A. DAY.

Witnesses:
GEORGE B. SATTERLEE,
ARTHUR C. FRASER.